May 8, 1956
M. AMIRAULT ET AL
2,744,772
DEVICES FOR EFFECTING A TIGHT FIT BETWEEN
A REVOLVING PART AND A FIXED PART
Filed April 12, 1954
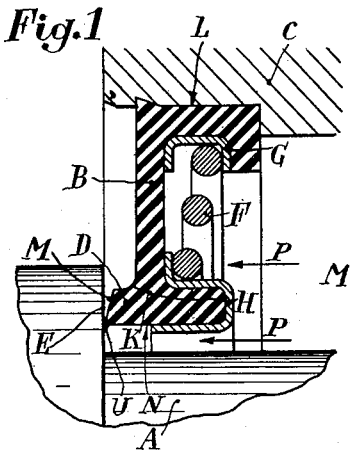
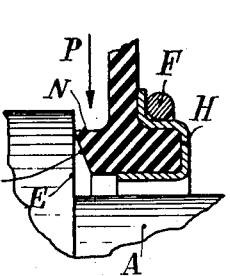
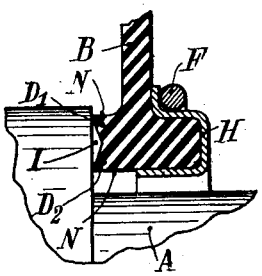
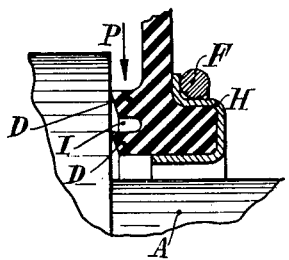
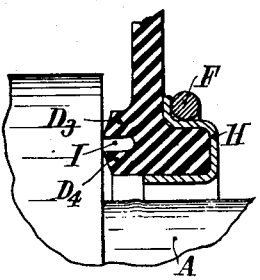
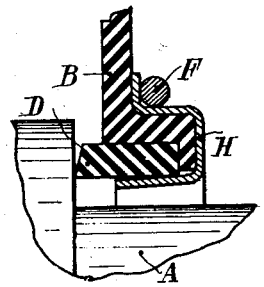
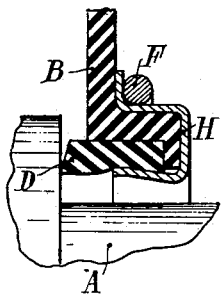

United States Patent Office 2,744,772
Patented May 8, 1956

2,744,772

DEVICES FOR EFFECTING A TIGHT FIT BETWEEN A REVOLVING PART AND A FIXED PART

Maxime Amirault, Puteaux, and Paul Destoumieux, Neuilly-sur-Seine, France

Application April 12, 1954, Serial No. 422,630

Claims priority, application France June 8, 1953

5 Claims. (Cl. 286—11)

This invention relates to improvements in sealing devices where the seal must be stationary on one part, as for example, on a housing, and allow relative sliding motion with respect to another part, such as a shaft.

Heretofore elastic materials such as rubber have been used for manufacturing oil retaining packing for shafts extending through a crank-case. The packing thus formed generally comprises an annular membrane or flexible diaphragm, fixed to the crank-case by keying or press fitting, and having a hole in its center through which the shaft revolves.

In order to secure a satisfactory seal, the part of the membrane which is in the line of contact with the shaft is given an extremely reduced bearing surface or knife edge. Permanent contact by the sealing element against a sealing surface is obtained by the action of a separate spring. While so engaged, the frictional heat produces a premature aging of the rubber or elastic material, which increases its durometer or hardens and it loses its elasticity. In a comparatively short working period, this results in either the need to replace the spring to overcome the hardness of the rubber in order to maintain contact or the forming of cracks in the frictional surfaces due to the shrinking of the material away from the shaft with the consequent loss of an effective seal.

A principal object of this invention, is to eliminate these disadvantages by utilizing a packing enabling permanent contact to be maintained, thus assuring the possibility of operation in spite of very great wear, at the line of contact and enabling the elastic material to continue to be employed, whatever the state of its hardness or durometer.

One of the novel features of the invention is in that the annular membrane makes contact, through the intermediary of a lateral annular wedge-shaped flange, on a flat or tapered surface provided for this purpose on the crank-case or on the shaft.

This lateral annular flange or circular sharp projecting edge carried by the membrane can be made of the same material as the rest of the membrane, or may be made of a different material attached to the latter by molding, glueing, setting or other means.

Other objects of the invention are disclosed in the description which is appended below in a purely indicative and by no means restrictive manner, of a certain number of forms of embodiment of the invention.

In the accompanying drawings illustrating preferred embodiments of the invention, in which the same reference numerals designate the same parts in all the views:

Fig. 1 is a vertical section of the complete seal in accordance with the invention.

Fig. 2 is a fragmentary sectional view of the tubular extension integral with the membrane and showing the wedge-shaped lip.

Fig. 3 is a fragmentary sectional view showing the bearing face as frusto-conical and having two sharp projecting edges.

Fig. 4 is a fragmentary sectional view showing two spaced wedge-shaped lips with both sharp edges facing the same direction normal to the fluid pressure and enclosing a lubricant reservoir.

Fig. 5 is a fragmentary sectional view showing the integral diaphragm extension as two spaced lips with their flat faces facing each other and enclosing a lubricant reservoir.

Fig. 6 is a fragmentary sectional view showing the wedge-shaped lip attached to the tubular extension of the membrane.

Fig. 7 is a fragmentary sectional view of a modification showing the flange fixed to the membrane by the reinforcing ring.

The packing shown in Fig. 1 consists of an annular membrane B, fixed at its periphery to the crank-case C by being tightly inserted in a bore L, in the conventional manner, but bearing in its most internal part a lateral lip-shaped annular flange D. The flange D is held in contact with the annular face or shoulder E of the shaft A under the pressure of a spring F wound spirally and of a general truncated shape when slack. The spring F presses, on the one hand by its larger diameter on a metal ring G which helps to hold the fixed membrane in the crank-case C, and on the other hand, by its smaller internal diameter enables the friction flange D to be applied with even pressure on its seating or contact surface E.

The lip-shaped lateral annular flange D has a tapered face M and a flat face N. The projecting angle U situated between these two faces forms a prominent edge and is in contact along a circular narrow path with the shoulder E, which, itself, acts as a seating for the annular lateral flange D. Its faces M and N are arranged in such a way that when pressure P is applied to the interior of the crank-case in the direction shown by the arrow, the film of liquid which tends to pass through the packing is stopped in front by the flat face N and not canalized by the oblique face M of the membrane (see Fig. 1). Thus, in a case where the pressure P is applied in the other direction with regard to the membrane B the faces M and N are arranged in an inverse manner as shown in Fig. 2.

Should it be intended to block the way of the liquid in both directions, a double-lipped membrane is employed, having two flanges $D_1$ and $D_2$ whose flat faces N are opposed to each other as shown in Fig. 3, these two lip-shaped flanges forming a groove I between their two oblique faces. This groove I can be used for holding a reserve of lubricant.

The invention can be modified so that its seal efficiency can be increased by providing the membrane with two or even several lip-shaped flanges D arranged in the same way (see Fig. 4). In the case where the liquid to be retained acts as a lubricant, and is not continually in contact with the lip-shaped flanges, the arrangement can be employed that is shown in Fig. 5, in which the two lip-shaped flanges $D_3$ and $D_4$ have their flat faces N placed face to face, the liquid being able to pass along the oblique faces N towards the groove I separating the two faces N, and being thus held in reserve in said groove I.

According to other forms of embodiment of the invention, the frictional flanges D are extended over the rest of the membrane. They can thus be made of a material having a low coefficient of friction, for example, of rubber containing a high percentage of graphite, whereas the membrane would, for example, be made of flexible rubber with a low percentage of graphite. The flange forming the friction lip-shaped flange or flanges D can be fixed to the membrane by direct molding or glueing. Thus, the limit between the two materials is shown in Figure 1 by the line K.

The flange can be fixed to the rest of the membrane by means of the reinforcing ring H, either by a tight insertion, as shown in Fig. 6 or by setting, as shown in Fig. 7.

Other kinds of packing can also be achieved within the scope of the invention, for example, with reinforcements of various shapes, in molded or other material. Contact lips can be used with flat or round faces. In the case where the lips are cone-shaped, the orientation of the leading angle is selected with regard to the direction in which the pressure is exerted.

The membrane can be directly fixed in the crank-case by means of metal rings. Tightening can be effected by stuffing-box or screws, or springs can be utilized that differ from those described above, for instance, leaf or spiral springs fixed to the periphery. The diaphragm may be fixed to a rotating element such as a shaft with the flange bearing on a stationary surface, such as the crank case C.

In all the forms of embodiment given by way of example, we have shown flat pressure surfaces; it will be perceived that by employing cone-shaped, spherical or toric surfaces a leading angle can be obtained adapted to the direction in which the pressure acts with a packing having lips without a slope and pressing by a sharp edge.

It is clearly understood that within the scope of the invention the membrane can be made of materials other than rubber, provided that such materials are flexible and that these packings are also suitable both for a gaseous as well as a liquid fluid.

What we claim is:

1. A fluid-seal packing to be fitted between a part having a bearing surface and another part rotating with respect to said first part, comprising an annular resilient membrane having two radially spaced coaxial peripheral portions, a reinforcing ring for rigidly securing one of said peripheral portons of said membrane on said other part, the other peripheral portion of said membrane being formed with a tubular extension directed towards the bearing surface of said first part with an annular front face formed with at least one projecting circular edge for sealing contact with said bearing surface and having a second extension directed away from said bearing surface and including a substantially flat annular rear face, another reinforcing ring enveloping the rear annular face of said tubular extension and partially lining said tubular extension, and a spring located between said first and second reinforcing rings to urge said tubular extension toward said bearing surface until said projecting circular edge engages said bearing surface.

2. A fluid-seal packing to be fitted between a part having a plane bearing surface and another part rotating relative to said first part, comprising an annular resilient membrane having two radially spaced coaxial peripheral portions, a reinforcing ring for rigidly securing one of said peripheral portions of said membrane on said other part, the other peripheral portion of said membrane being formed with a tubular extension directed towards the bearing surface of said first part with an annular front face having a frusto-conical surface limited at one of its marginal portions by a circular sharp projecting edge for sealing contact with said bearing surface and having a second extension directed away from said bearing surface and including a substantially plane annular rear face, another reinforcing ring enveloping said annular rear face of said tubular extension and lining partially said tubular extension, and a spring located between said two reinforcing rings to force said tubular extension toward said bearing surface until said circular sharp projecting edge engages said bearing surface.

3. A fluid-seal packing to be fitted between a part having a plane bearing surface and another part rotating relative to said first part about an axis of rotation extending normally to said plane bearing surface, comprising an annular resilient membrane formed with a solid flange having a periphery extending on either side of said flange to form a front edge directed towards said bearing surface of said first part and having a second extension directed away from said bearing surface and including a rear edge, said front and rear edges being coextensive to form a cylindrical tubular portion coaxial with said axis of rotation, said front edge ending with an annular face having a frusto-conical surface limited at one of its marginal portions by a circular, sharp projecting edge for sealing contact with said bearing surface, the rear edge ending with a substantially plane annular face, said solid flange of said resilient membrane having another peripheral portion forced against said other part, a reinforcing ring surrounding and lining said annular face of said rear edge of said first flange periphery, another reinforcing ring rigidly securing said other periphery of said flange on said other part, and a spring located between said two reinforcing rings to axially urge the said cylindrical tubular portion constituted by said two edges of said first periphery of the resilient membrane solid flange towards said bearing surface of said first part until said circular projecting sharp edge of said annular face of the front edge of said first periphery of said solid flange of the resilient membrane engages said bearing surface.

4. A fluid-seal packing to be fitted between a part having a bearing surface and another part rotating with respect to said first part, comprising an annular resilient membrane having two radially spaced coaxial peripheral portions, a reinforcing ring rigidly securing one of said peripheral portions of said membrane to said other part, the other peripheral portion of said membrane having a tubular extension directed towards the bearing surface of said first part with an annular front face formed with a pair of concentric circular projecting edges for sealing contact with said bearing surfaces and having a second extension directed away from said bearing surface and including an annular, substantially plane rear face, another reinforcing ring enveloping said annular rear face of said tubular extension and lining partially said tubular extension, and a spring disposed between said pair of reinforcing rings to urge said tubular extension toward said bearing surface until said pair of projecting concentrical circular edges engage said bearing surface.

5. A fluid-seal packing to be fitted between a part having a bearing surface and another part rotating relative to said first part, comprising an annular resilient membrane formed with two radially spaced coaxial peripheral portions, a reinforcing ring for rigidly securing one of the peripheral portions of said membrane to said other part, the other peripheral portion of said membrane comprising a tubular resilient element directed towards the bearing surface of said first part with an annular front face having a projecting circular edge for sealing contact with said bearing surface, another reinforcing ring for stiffening said other peripheral portion of the membrane by assembling said tubular resilient element therewith, said tubular resilient element having a free end portion towards said bearing surface of said first part, and a spring disposed between said two reinforcing rings to urge said tubular resilient element toward said bearing surface until said projecting circular edge engages said bearing surface.

References Cited in the file of this patent

UNITED STATES PATENTS

| 750,090 | Coleman | Jan. 19, 1904 |
| 2,005,587 | Lorig | June 18, 1935 |
| 2,220,984 | Wiessner | Nov. 12, 1940 |
| 2,250,348 | Beier | July 22, 1941 |
| 2,263,178 | Lignian et al. | Nov. 18, 1941 |
| 2,560,557 | Curtis | July 17, 1951 |
| 2,573,591 | Nelson | Oct. 30, 1951 |
| 2,576,721 | Nelson | Nov. 27, 1951 |
| 2,592,645 | Kayser | Apr. 15, 1952 |
| 2,646,296 | Destoumieux et al. | July 21, 1953 |

FOREIGN PATENTS

| 558,544 | Great Britain | Jan. 10, 1944 |